July 5, 1927.  
J. F. MARTIN  
LUGGAGE CARRIER  
Filed Nov. 15, 1926

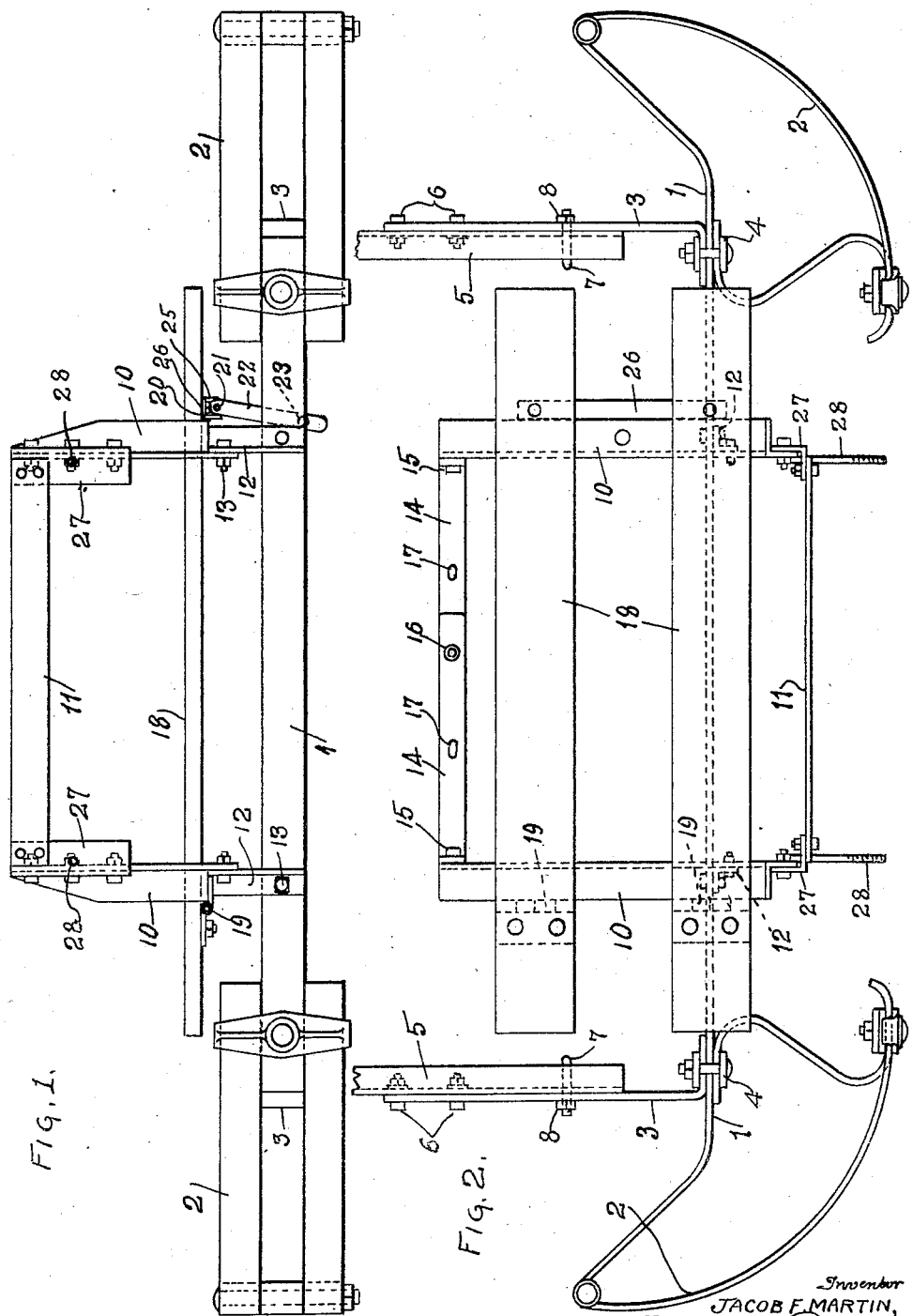

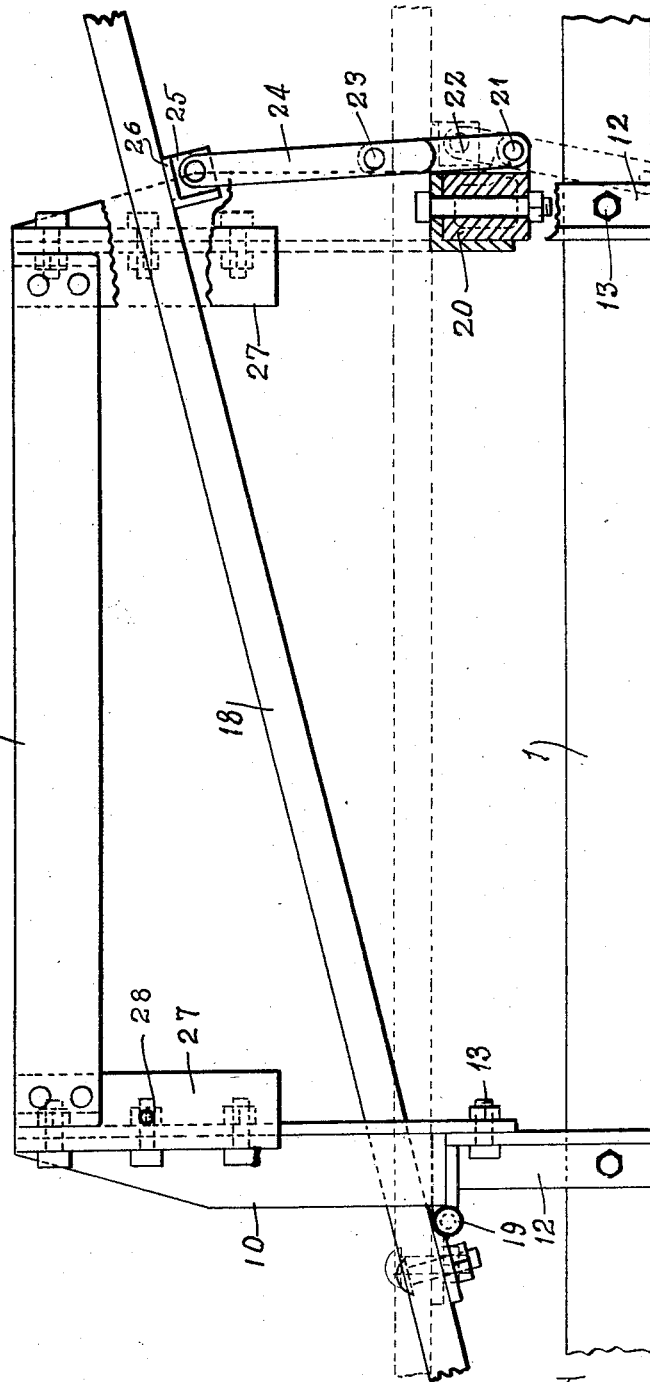

Inventor  
JACOB F. MARTIN,  
By Taulmin &Taulmin,  
Attorneys

Patented July 5, 1927.

1,634,590

UNITED STATES PATENT OFFICE.

JACOB F. MARTIN, OF BELLEVUE, OHIO, ASSIGNOR TO THE BELLEVUE MANUFACTURING COMPANY, OF BELLEVUE, OHIO, A CORPORATION OF OHIO.

LUGGAGE CARRIER.

Application filed November 15, 1926. Serial No. 148,366.

This invention relates to improvements in luggage carriers for use principally on automobiles.

The object of the invention is to provide a luggage carrier which may be positioned at a relatively low point on an automobile, thereby providing a strong installation and permitting a trunk to be carried at a height which will best conform to the general lines of the automobile.

On some cars, such low installation of the luggage carrier will bring it close to the gas tank intake and it is an object of the present invention to provide the carrier with means to elevate the platform thereof, which is adapted to receive a trunk or other luggage, so that it may be moved away from the tank intake, thereby permitting ready access thereto when it is desired to fill the tank.

A further object of the invention is to provide means for maintaining the platform locked both in its up and down positions.

A further object of the invention is to combine the luggage carrier with a cross bar and to utilize the latter as the main support for the carrier proper.

And a further object of my invention is to equip my luggage carrier with means for supporting a spare tire carrier.

These several objects are carried out in practice by the arrangement and construction hereinafter described in detail.

In the accompanying drawings:

Fig. 1 is a rear elevation of my improved luggage carrier secured to a bumper;

Fig. 2 is a top plan view of the devices shown in Fig. 1;

Fig. 3 is a rear elevation of the luggage carrier with the platform in elevated position;

Figure 5:
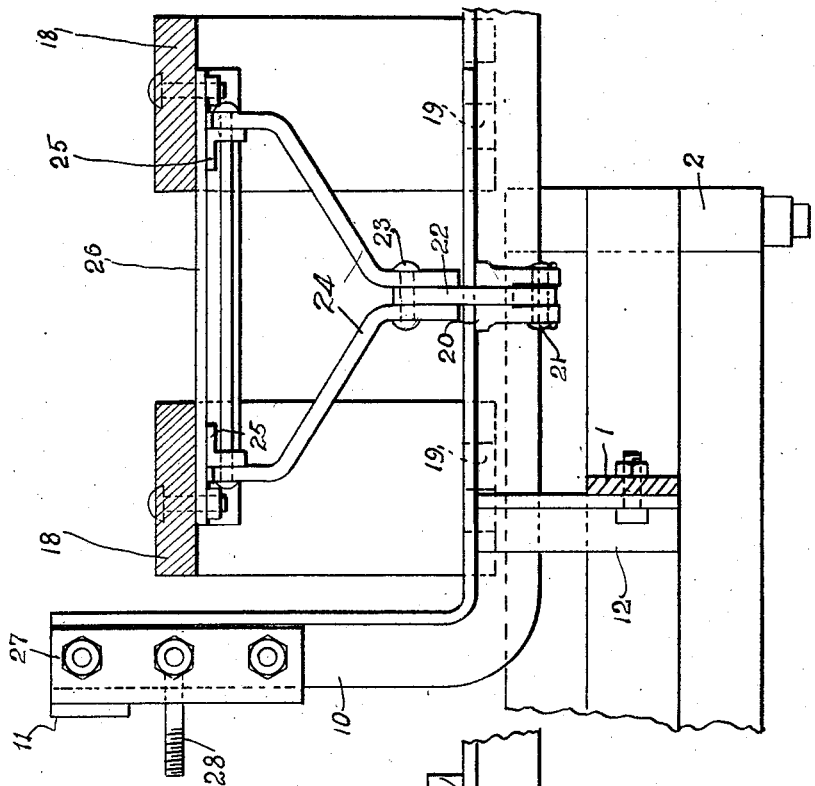
Fig. 5 is a like view showing the platform locked in its elevated position.

In these drawings the numeral 1 designates the main or cross bar of a conventional rear bumper, but it will be understood that in the absence of a bumper the cross bar of the chassis frame may be utilized, the drawings being merely illustrative of the application of the invention to a car equipped with a rear bumper. In the present instance, the bumper is shown equipped at its ends with so-called "bumperettes" indicated by the numeral 2 which form protection for the rear fenders of the automobile. This rear bumper is equipped with brackets 3 secured to the cross bar 1 by the fastening devices 4 and extending rearwardly and secured to the side bars 5 of the usual automobile chassis. Bolts and nuts 6 are employed to fasten the brackets 3 to the side bars of the chassis, whereby the machine is equipped with this rear bumper. Additional means for securing the bracket 3 to the chassis frame comprises hook-bolts 7 held by nuts 8.

Referring now to my luggage carrier it will be seen to consist of supporting members 10 preferably of one piece angle iron consisting of a horizontal portion and a vertical right angle portion braced at the top by a cross bar 11.

In practice the carrier is mounted so that the vertical portions of the angle irons are at the rear, thereby providing protection for the trunk or luggage, as well as a means for mounting a tire carrier, as will hereinafter appear. As here shown the carrier is sustained at the rear by the bumper cross bar 1, angle spacers 12 being secured to the bar and to the horizontal portion of the supporting members 10 by bolts and nuts 13, thus forming a rigid connection between the angle irons and bumpers. The portion of the carrier which is to be mounted adjacent the body of the automobile may be provided with any suitable form of attachment adapted to the particular type of car to which it is to be applied. In the present instance I have shown the carrier applicable to a Star 4 and 6 coach in which cross bars 14 are rigidly secured at points adjacent the ends of the horizontal portions of the members 10, as by fastening devices 15. These bars may be secured to one another, as shown at 16, and are provided with slots 17 which match with holes in the body or gas tank cover of the automobile to receive suitable fastening devices, whereby the carrier is attached to the body of the automobile.

In order that the trunk carrier may be placed on the automobile at a point which will give it the most substantial installation, in the case of some cars at a point close to the gasoline tank, it is necessary to provide means for elevating the trunk or luggage when it is desired to put gas into the tank.

Figure 4:
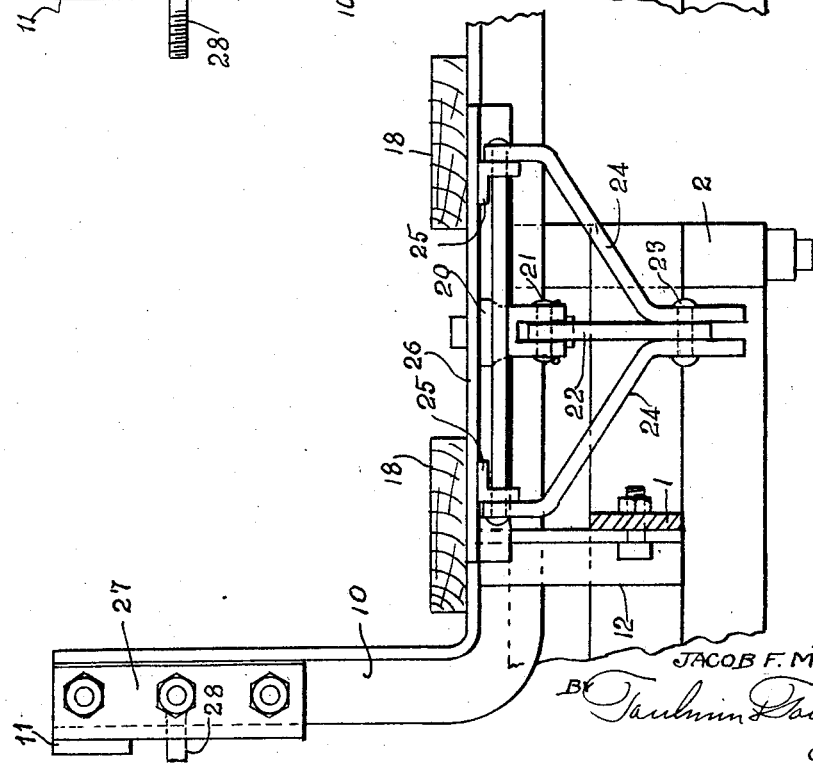
Fig. 4 is a end view of the carrier showing the platform locked in its normal or horizontal position.

To this end I have provided the carrier with a platform which may be elevated and locked in either its elevated or normal position. The means for accomplishing this result consists of a platform 18 pivotally secured to the horizontal portion of one of the angle irons 10 by hinges 19. Rigidly secured to the horizontal portion of the other angle iron 10 is a bracket 20 having projections in the nature of ears between which is pivotally mounted at 21 one end of a bar 22, the opposite end of which is pivotally secured at 23 between fork members 24, the upper diverging outer ends of which are pivotally mounted in angle members 25 which are rigidly secured to the cross bar 26 of the platform, the bar 22 and fork 24 constituting a toggle joint. When the platform of the carrier is in normal or horizontal position, the parts constituting the elevating locking devices are in the position shown in Fig. 4, with the bar 22 and the fork member 24 beyond dead center position, thus firmly securing the platform to the angle iron supports 10.

When it is desired to elevate one end of the platform for access to the gasoline tank the operator grasps the lower extremity of the fork members and pulls them toward himself until the bar 22 and fork 24 are in substantially horizontal position when such end of the platform may be elevated until the toggle members are in extreme extended or vertical position. The elevation of one end will cause the platform to assume a tilting position, whereby access may be had to the gasoline tank even when a trunk or other luggage is being carried by the platform.

In order to maintain one end of the platform in elevated position, as shown in Fig. 5, the toggle members are pushed forwardly past dead center until the bar 22 strikes the horizontal angle member 10, thus rigidly fastening the platform in its extreme tilting position. To lower the platform to normal or horizontal position, the operator takes hold of the platform and raises it up and pulls the center of the fork 24 out past dead center. The platform may then be lowered to its normal position and rigidly held in such position by pushing the lower end of the fork back until it throws past dead center and strikes the horizontal angle member 10.

While I have shown and described the elevating and securing means as located at the ends of the carrier I wish it to be understood that such means may be applied at the sides instead of the ends, and the platform elevated lengthwise instead of endwise should such construction be desired.

When it is desired to carry a spare tire at the rear of the automobile equipped with my luggage carrier an angle bracket 27 may be rigidly secured to each angle iron 10, pins 28 mounted in such brackets being adapted to carry any desired mechanism for supporting a tire, rim or wheel.

While I have shown and described my luggage carrier as adapted to be applied to one type of car, namely, a Star 4 and 6 coach equipped with a rear bumper, it will readily be understood that it may be installed on any automobile, with or without bumpers, and I desire to comprehend within my invention such modifications as may be necessary to adapt it to any automobile, as also other uses.

Having thus fully described my invention, what I claim as new and desire to secure by Letters Patent, is:—

1. In a luggage carrier, supporting angle irons, a bracket secured to one of said angle irons, a platform hinged to one of said angle irons, and pivotally connected to said bracket, said pivotal connection comprising a bar pivotally mounted in said bracket, fork members pivoted to said bar at one end and to said platform at the other end, whereby said platform may be elevated and rigidly held in either its raised or lowered positions.

2. In a luggage carrier, supporting members, a platform pivotally secured to one of said members, and means secured to the other of said members and to said platform for moving said platform away from said other supporting member into an inclined position and for rigidly maintaining it in such inclined position.

3. In a luggage carrier, supporting members, a platform adapted to be supported in a substantially horizontal plane by said members, means for pivotally securing said platform to one of said members, means for moving said platform from such horizontal position to an inclined position, said last mentioned means comprising elevating members secured to the platform and other supporting member.

4. The combination with a luggage carrier adapted to be mounted on an automobile comprising supporting members, a platform adapted to be supported in a substantially horizontal plane by said members, means for pivotally securing said platform to one of said members, and means for moving said platform from such horizontal position to an inclined position, said last mentioned means comprising elevating members secured to the platform and other supporting member, of a cross bar adapted to be secured to the chassis of an automobile, means for rigidly connecting said supporting members and said cross bar, and other means to connect the carrier supporting members to the automobile.

5. The combination with a luggage carrier adapted to be mounted on an automobile comprising supporting members, a platform adapted to be supported in a substantially horizontal plane by said members, means for pivotally securing said platform to one of said members, means for moving said platform from such horizontal position to an inclined position comprising elevating members secured to the platform and the other supporting member, a cross bar adapted to be secured to the chassis of an automobile, means for rigidly connecting said supporting members and said cross bar, and other means to connect the carrier supporting members to the automobile, of other devices carried by said angle irons and adapted to support an extra tire carrier.

In testimony whereof, I affix my signature.

JACOB F. MARTIN.